United States Patent
Mizrahi et al.

(10) Patent No.: US 7,807,969 B2
(45) Date of Patent: Oct. 5, 2010

(54) METHOD AND SYSTEM FOR DETERMINING THE RATE OF NON UNIFORMITY OF BOLOMETER BASED SYSTEMS

(75) Inventors: Udi Mizrahi, Haifa (IL); Avraham Fraenkel, Haifa (IL); Zvi Kopolovich, Timrat (IL); Amnon Adin, Haifa (IL); Leonid Bikov, Nasrat Elite (IL)

(73) Assignee: Semi-Conductor Devices—An Elbit Systems—Rafael Partnership, Haifa (IL)

( * ) Notice: Subject to any disclaimer, the term of this patent is extended or adjusted under 35 U.S.C. 154(b) by 161 days.

(21) Appl. No.: 11/886,681

(22) PCT Filed: Jan. 12, 2006

(86) PCT No.: PCT/IL2006/000048

§ 371 (c)(1), (2), (4) Date: Nov. 17, 2008

(87) PCT Pub. No.: WO2006/100663

PCT Pub. Date: Sep. 28, 2006

(65) Prior Publication Data

US 2009/0194696 A1    Aug. 6, 2009

(30) Foreign Application Priority Data

Mar. 24, 2005 (IL) .................................. 167637

(51) Int. Cl.
*G01J 5/00* (2006.01)
(52) U.S. Cl. ............... 250/338.1; 250/332; 250/339.02; 250/339.04; 250/339.09; 250/352
(58) Field of Classification Search ................. 250/332, 250/338.1, 339.02, 339.04, 339.09, 352
See application file for complete search history.

(56) References Cited

U.S. PATENT DOCUMENTS 5,600,143 A * 2/1997 Roberts et al. ............... 250/349

(Continued)

FOREIGN PATENT DOCUMENTS

EP    1117250 A2 * 7/2001

*Primary Examiner*—David P Porta
*Assistant Examiner*—Djura Malevic
(74) *Attorney, Agent, or Firm*—Frommer Lawrence & Haug LLP; William S. Frommer

(57) ABSTRACT

A focal plan array system of the bolometer type having means for determining the rate of non-uniformity which comprises: (a) an array of i×j pixel detectors of the bolometer type for sensing scenery radiation; (b) a case which accommodates said array of detectors, said case having a front window that provides exposure to the sensing element of all the i×j pixel detectors to radiation coming from the scenery; (c) at least a portion of column j+1 of blind detectors that are shielded from the scenery by a homogeneous reference surface; (d) reading circuitry for reading indication for the scenery radiation as sensed by each of the i×j detectors of the array, and for reading indication for the non uniformity as sensed by said detectors in column (j+1); (e) a register for recording the radiation values as read from all the detectors within column (j+1); and (f) a processing unit for finding the standard deviation σ of all the values in said register, and for comparing the same to a predetermined threshold Q, wherein a standard deviation above Q being an indication for a non uniformity above the allowed level.

8 Claims, 4 Drawing Sheets

U.S. PATENT DOCUMENTS

| | | | |
|---|---|---|---|
| 6,141,048 A * | 10/2000 | Meyers | 348/294 |
| 6,410,916 B1 * | 6/2002 | Jost et al. | 250/332 |
| 6,515,285 B1 | 2/2003 | Marshall et al. | |
| 6,583,416 B1 | 6/2003 | Villani | |
| 2007/0215805 A1 * | 9/2007 | Boie et al. | 250/338.1 |
| 2009/0008555 A1 * | 1/2009 | Dupont et al. | 250/338.1 |

* cited by examiner

METHOD AND SYSTEM FOR DETERMINING THE RATE OF NON UNIFORMITY OF BOLOMETER BASED SYSTEMS

FIELD OF THE INVENTION

The field of the invention relates to uncooled focal plane arrays of the bolometer type used for sensing IR radiation. More particularly, the present invention relates to a method and system for measuring the degradation in the uniformity of sensing light by the various detectors of the focal plane array, and for providing an indication as to when special measures should be taken in order to perform non uniformity recalibration.

BACKGROUND OF THE INVENTION

Bolometers are widely used for sensing low radiation of light, generally in the IR band. In most conventional cases, the bolometers are provided in a form of a focal plan array (FPA), wherein the array comprises a plurality of individual sensing elements (hereinafter also referred to as or "pixels", or "pixel detectors"). A significant advantage of the bolometer type sensors is their reduced weight and power consumption, particularly due to the fact that they do not require cryogenic cooling. In addition, they are generally much less expensive in comparison with cooled focal plan arrays. However, the typical sensitivity of bolometer type sensors is significantly lower than of cooled-type sensors. Moreover, as bolometer type sensors are very sensitive to temperature variation, they require special means for stabilizing the temperature of the array substrate, and for compensating each individual detector for said temperature variations. It should be noted that the case that accommodates the FPA contributes roughly 80% of the IR flux. Thus, it is of vital importance to monitor the case temperature or its radiation.

Vox (Vanadium Oxide) resistors are widely used in typical bolometers, as the Vox has a relatively large TCR (temperature coefficient of resistance), and low 1/f contribution.

Typical bolometer FPAs are required to detect radiation with a resolution in the order of $50°$ mK of the scenery temperature. The temperature variations at the bolometer detector due to the heat variations within the scenery are in the order of $0.01$-$0.1°$ mK. It should be noted that in order to bring the bolometer detector to its operational point, it is required to heat the active resistor of the detector (the resistor which is exposed to the scenery) by a temperature in the order of $4°$. Said necessity to provide a sensitivity and resolution in the range of at least 40 orders less than the heating of the active bolometer resistor generally enforces the use of a differential measurement. The most common and simple circuitry that applies differential measurement is the Wheatstone bridge, and a detector which include a Wheatstone bridge is indeed commonly used in bolometer-type FPAs.

However, even though a Wheatstone bridge which performs a differential measurement is used, the prior art uncooled bolometer-type FPAs are still very sensitive to variations in the ambient temperature, and special compensation circuitry is required for compensating in the FPA pixel level. More particularly, special circuitry is required to compensate for the non-uniformity of the detectors (i.e., to compensate for their different offset and gain), and to further compensate for the non-uniform effect of the change of the ambient temperature on each detector. The said latter non uniformity arises mainly from the fact that each detector has a different relative location with respect to the case walls.

In order to account for the non-uniformity of the FPA pixel detectors, prior art bolometer-type FPA manufacturers, or the users themselves commonly perform pre-measurements which determine the gain and offset of each pixel detector. The measurements are performed for constant, predefined ambient (case) and substrate temperatures. The results of the measurements are provided in two matrices (or look up tables), a gain non-uniformity matrix, and an offset non-uniformity matrix. More particularly, by using said two matrices the gain and offset of each pixel detector are adjusted during the actual use of the FPA. It should be noted that the offset matrix is also updated periodically (for example, every 2-3 minutes) at times when a homogenous image is provided to the FPA. The homogenous image is typically applied by means of a shutter which is closed and masks the FPA from the scenery radiation. Alternatively, in some prior art cases the optics in front of the FPA is brought to a total "out of focus" state, thereby providing to the FPA an essentially homogenous image. During the closure period of the shutter (or the period of "out of focus state") the FPA of course cannot be used. During said periods the offset matrix is updated. Said procedure of calibration is generally referred to as NUC (Non-Uniformity Correction). It should be noted that each calibration procedure, that takes place, for example, every 2 to 3 minutes, takes several seconds.

Throughout this application whenever reference is made to "closure of shutter", it should be noted that it is meant to any action that provides a homogeneous image to the FPA, either by means of closure the shutter, by means of performing "out of focus", etc.

A said, the need to recalibrate the offset of each FPA detector during the closure of a shutter eliminates any active use of the FPA during said recalibration procedure. Said lost time which is dedicated for recalibration may be critical. However, the fact that the prior art lacks means for determining the rate of the non uniformity degradation, and in order to prevent operation with a too high degradation, has enforced the users to apply a relatively high, and constant rate of calibration (as said, for example every 2 to 3 minutes). In many cases this is a too high rate that is used for caution purposes only.

It is therefore an object of the present invention to provide an arrangement that will enable a significant reduction of the calibration rate (which takes place when the shutter is closed), therefore significantly increasing the actual operation time of the FPA.

It is still an object of the invention to provide an arrangement that will enable the performing of non-uniformity calibration only when it is indeed required.

It is still an object of the present invention to provide an indication for the rate of non-uniformity of the array during the actual operation of the array, and in real time.

It is still an object of the present invention to provide said arrangement in a manner which is simple to manufacture.

Other objects and advantages of the present invention will become apparent as the description proceeds.

SUMMARY OF THE INVENTION

The present invention relates to a focal plan array system of the bolometer type, which has means for determining the rate of non uniformity, which comprises: (a) an array of i×j pixel detectors of the bolometer type for sensing scenery radiation; (b) a case which accommodates said array of detectors, said case having a front window that provides exposure to the sensing element of all the i×j pixel detectors to radiation coming from the scenery; (c) at least a portion of column j+1 of blind detectors that are shielded from the scenery by a homogeneous reference surface; (d) reading circuitry for reading indication for the scenery radiation as sensed by each of the i×j detectors of the array, and for reading indication for the non uniformity as sensed by said detectors in column (j+1); (e) a register for recording the radiation values as read from all the detectors within column (j+1); and (f) a processing unit for finding the standard deviation a of all the values in said register, and for comparing the same to a predetermined threshold Q, wherein a standard deviation above Q being an indication for a non uniformity above the allowed level.

Preferably, the focal plane array system further comprises mechanism for providing a homogenous image to all the FPA detectors, and a calibrating circuitry for offset calibrating all the detectors of the FPA, said mechanism and circuitry are activated when said indication for non-uniformity is observed to be above said predetermined threshold Q.

Preferably, said homogeneous reference surface is baffle extending from the case.

Preferably, all the focal plan array detectors, including those within column (j+1) perform differential measurement of radiation.

Preferably, each of the detectors has a structure of a Wheatstone bridge type.

Preferably, each of the i×j Wheatstone bridge type detectors, and each of the detectors within column (j+1) has two branches, as follows: (a) a first branch comprising a first resistor $R_m$ which is thermally shorted to a substrate which supports the array and is common to all the decoders of the array and a second resistor $R_r$ common to each of the decoders within one of the rows i and which is shielded by said at least one homogeneous reference surface; and (b) a second branch comprising a third resistor $R_c$ which is thermally shorted to the said supporting substrate and which is common to all of the decoders within each of the columns j and a fourth resistor $R_p$ which is unique for each decoders and which is exposed to the scenery.

Preferably, the reading circuitry comprises a row selector for selecting at each time a row of the array, and j+1 column amplifiers for correspondingly receiving and amplifying the sensed radiation by each of the decoders within the selected row.

The present invention also relates to a method for determining the rate of the non uniformity in a focal plane array of the bolometer type, comprising the steps of: (a) providing a focal, plane array of i×j bolometer type detectors, all being exposed to the scenery; (b) providing at least a portion of an additional column (i+1) of bolometer type detectors, all said detectors in column (j+1) being masked from the scenery by means of a homogeneous surface; (c) predefining a non uniformity threshold Q, relating to the non uniformity of behavior of the decoders; (d) sequentially reading in a row by row manner the values as sensed by the i×j detectors of the FPA and as sensed by the detectors in the (j+1) column; (e) recording at a column register the readings that are sensed by the decoder of column j+1; (f) calculating the standard deviation of all the values in said column register and comparing the standard deviation with the threshold Q; (g) if said standard deviation is found to be below Q, continuing to normally operate the FPA; and (h) if, however, the standard deviation is found to be above Q, stopping the operation of the FPA, and performing a non uniformity calibration of the FPA decoders.

DETAILED DESCRIPTION OF PREFERRED EMBODIMENTS

Figure 1:
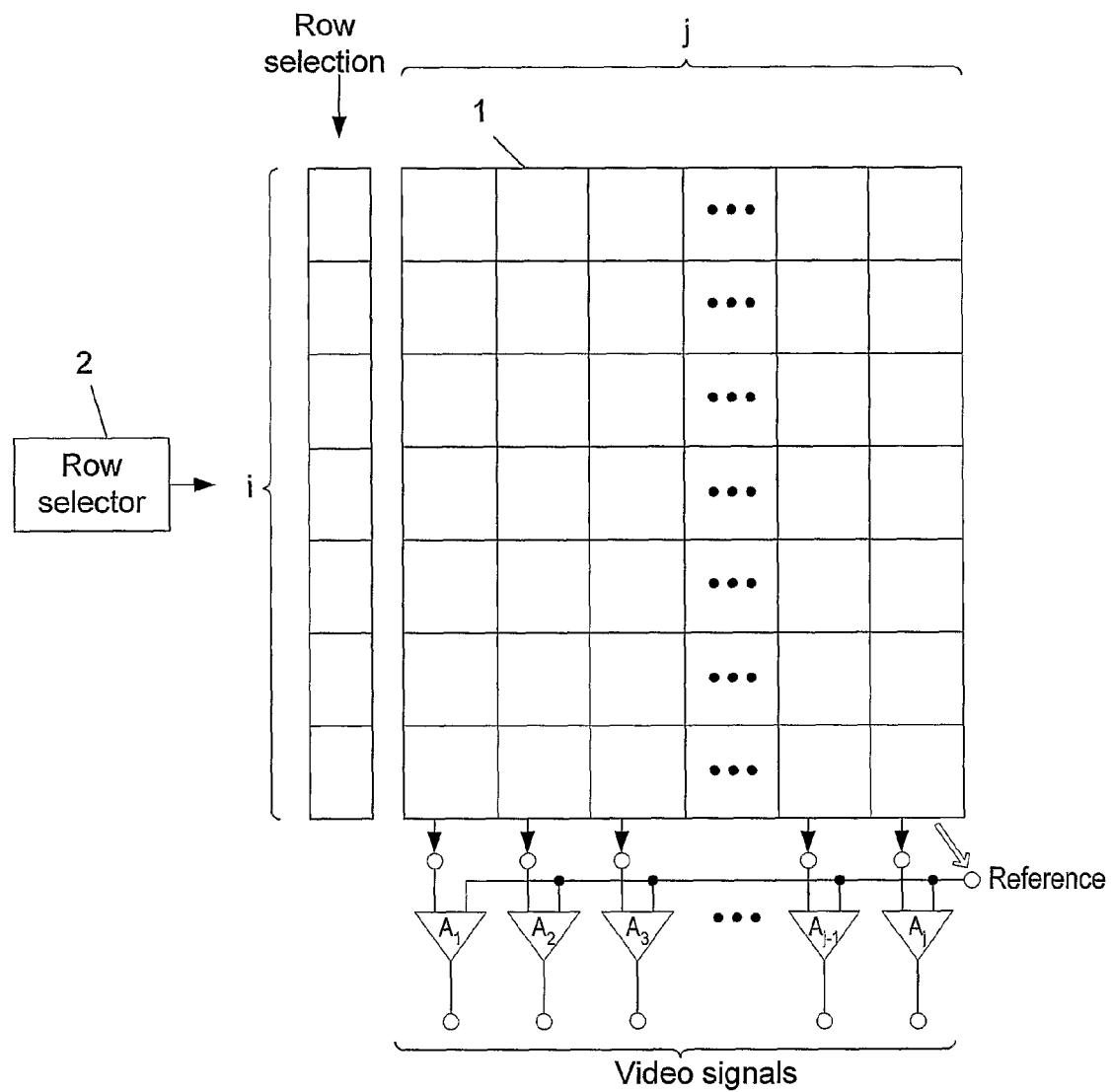
FIG. 1 shows the general structure of a typical, prior art FPA of the bolometer type.

The general structure of a typical FPA 1 of the bolometer type is shown in FIG. 1. The FPA 1 has i rows and j columns, therefore comprising i×j bolometer-type pixel detectors. The readout from the FPA is performed by selecting a full row of pixel detectors by means of row selector 2. When a row is selected, all the detectors of the selected row are simultaneously sensed, and the readouts from all the pixel detectors of the selected row are provided into the inputs of corresponding j column amplifiers $A_1$-$A_j$. As will be elaborated hereinafter, when a row is selected, the reference signal is common to all the column amplifiers.

Figure 2:
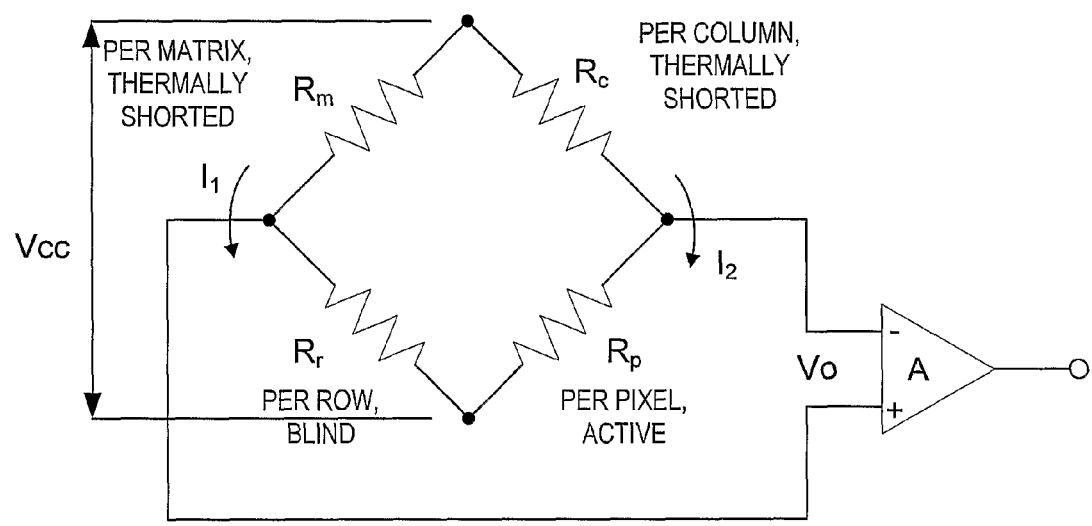
FIG. 2 shows the general structure of one of the i×j pixel detectors of the FPA of FIG. 1.

FIG. 2 shows the general structure of one of said i×j pixel detectors of the FPA of FIG. 1 according to an embodiment of the prior art. As shown, all resistors of the detector are arranged in a form of Wheatstone bridge, which provides a differential measurement. The resistor $R_p$ is the "active" resistor which is specific to each pixel detector. All the resistors $R_p$ are thermally isolated and are exposed to the scenery. The resistor $R_r$ is a resistor which is common to all the pixel detectors of each row, and which is referred to herein as a "blind" resistor, as it is totally masked from the scenery. Resistor $R_m$ is one resistor which is common to all the pixel detectors of the FPA, said resistor $R_m$ is thermally shorted to the substrate of the FPA. Resistor $R_c$ is one resistor per column, which is common to all the pixel detectors within each column, and which is also thermally shorted to the substrate. Therefore, in the exemplary FPA of FIG. 1, there are i×j resistors $R_p$, j resistors $R_c$, i resistors $R_r$, and one resistor $R_m$. All the resistors are preferably of Vox type, and should preferably have as identical properties as possible, more particularly, as identical as possible resistance, same thermal coefficient of resistance (TCR), and same thermal capacitance and resistance. It should be noted that one or more of the resistors $R_p$, $R_c$, $R_r$, and $R_m$ may be made of several resistors that are connected in parallel. Whenever a pixel is selected, the differential readout is conveyed into the corresponding column amplifier $A_1$-$A_j$.

It should also be noted that while all the active resistors $R_p$ are constantly irradiated, the readout is streamed out one row at a time, using a single amplifier per column. The "blind" resistor $R_r$ is used for compensating against the dynamic behavior of the active resistor $R_p$. Therefore, it is located at a thermally isolated location which is masked from the scenery radiation. Said resistor $R_r$ is electrically connected only during the readout of the specific row. The other resistors $R_c$ and $R_m$ are connected during the readout of each row. These resistors are thermally shorted to the substrate in order to prevent their destruction due to excessive heating. Thus, when each specific bridge is active, there are formed essentially two almost identical branches of current, wherein the currents $I_1$ and $I_2$ cause a differential voltage $V_o$ which is a function of the scenery radiation which is applied over $R_p$.

Figure 3:
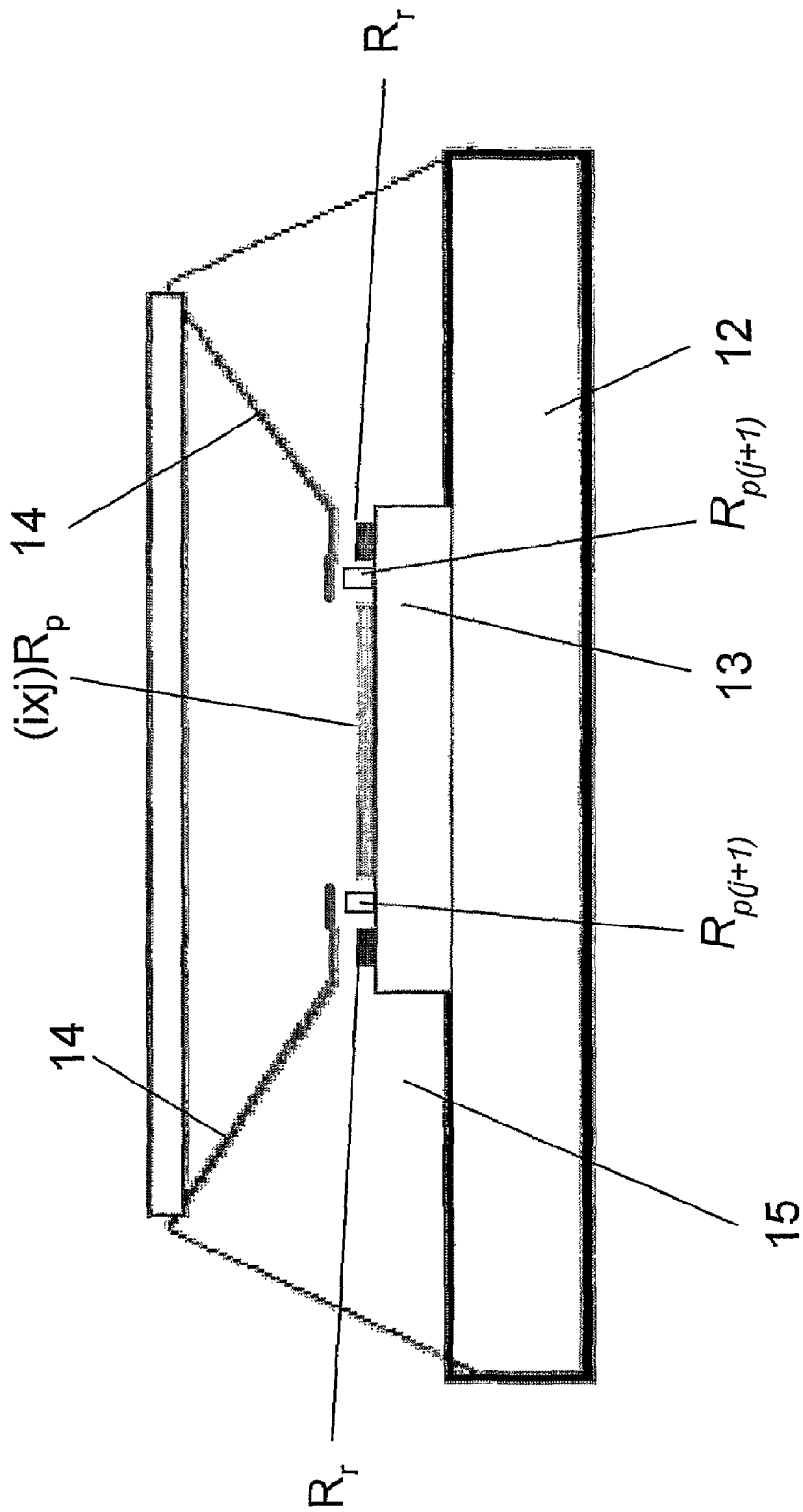
FIG. 3 illustrates the general mechanical structure of a bolometer-type FPA and its case, according to an embodiment of the present invention.

FIG. 3 illustrates the structure of a typical FPA 1. For the sake of brevity, the FPA was reduced to the size of 2×2 pixel detectors. The row select signals that are produced by the row selector 2 (FIG. 1), enable the selection of rows in a sequential order. When a row is selected, the voltage over the resistor $R_m$, which is one resistor common to all the FPA pixel detectors, is simultaneously provided to a first of the two inputs of each column amplifier as a reference signal. The voltage over each corresponding resistor $R_p$ within the selected row is provided to the second input of the corresponding amplifier. It can be easily seen that the structure is of a Wheatstone bridge, and therefore the radiation measurement within each detector is differential. The various resistors $R_c$ and $R_r$ complete the bridges.

As said, in order to account for the non-uniformity of the various FPA pixel detectors, prior art bolometer-type FPA manufacturers or the users themselves commonly perform pre-measurements which determine the gain curve and the offset of each pixel detector. The measurements are performed while the ambient (case) and substrate temperatures are kept constant at some pre-defined temperature. The results of the measurements are provided in two matrices (or look up tables), a gain non-uniformity matrix, and an offset non-uniformity matrix. More particularly, during the actual use of the FPA each pixel detector of the FPA is adjusted using the data of said two matrices. It should be noted that the offset matrix is updated periodically (for example, every 2-3 minutes) at times when a shutter is closed and masks the FPA from scenery radiation. Of course, the FPA cannot be used during the times in which the shutter is closed and the update is performed. Said procedure of correction is generally referred to as NUC (Non-Uniformity Correction).

As said, the prior art periodically closes a shutter or provides to the FPA a homogeneous image in order to obtain an updated offset matrix. The updating of said matrix disturbs the actual operation of the FPA, as the updating of said offset matrix cannot be performed during the FPA actual use. As will be shown, the present invention provides a structure which enables the determination of when the updating of the offset matrix is indeed required, so that a shutter closure will be performed only at those required times. More particularly, as will be shown the present invention determines during the actual use of the FPA the rate of the non uniformity of the array detectors, and only when this rate is above a predetermined non-uniformity value, the calibration procedure which involves the shutter closure is performed.

Figure 4:
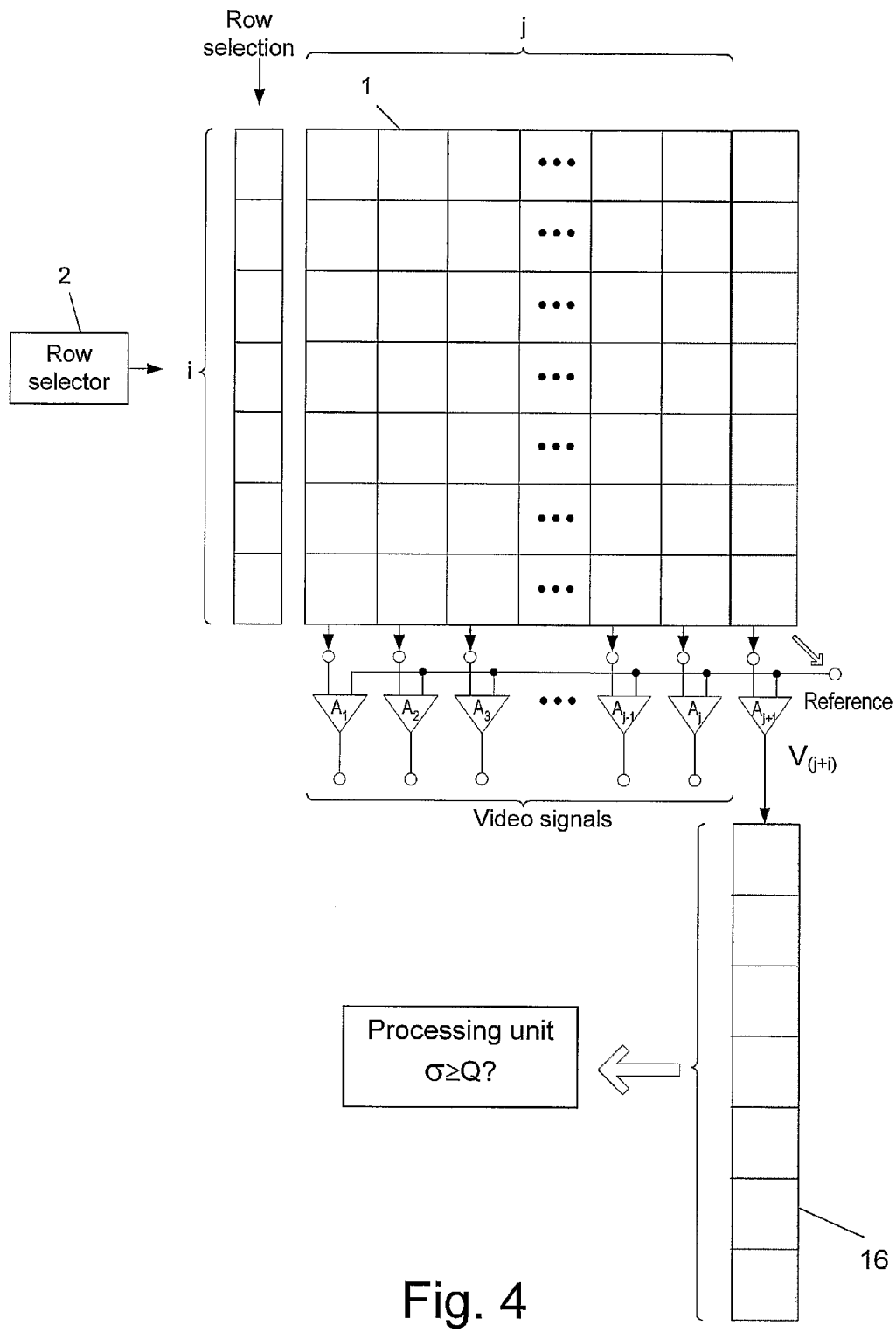
FIG. 4 illustrates the general structure of an FPA according to an embodiment of the present invention.

FIG. 4 illustrates the general structure of the FPA according to the present invention. As shown, the FPA of the present invention comprises an additional column of sensors, indicated as column j+1. Each pixel detector within said additional column has essentially the same structure as of the other detectors of the FPA. However, the resistor $R_{p(j+1)}$ in all the detectors of column (j+1) is shielded from the scenery by means of a reference homogenous surface. The term homogeneous refers herein to a state in which the surface has a same temperature and emissivity (i.e., same radiation) all over the surface. Therefore, all the detectors of column (j+1) always "see" only the homogenous surface, and they are totally masked from the scenery. In other words, all these "blind" detectors of column (j+1) see a homogenous image, essentially a same homogeneous image as all the FPA detectors see during a shutter closure at the prior art. The readout of each detector within column (j+1) is read simultaneously with the data of the other detectors 1 to j within the selected row. The individual readouts from a full column j+1 are then accumulated in a register 16, having up to i cells. When the register is full, the standard deviation σ of all the values in the register is calculated, and compared with a predefined deviation threshold Q. A standard deviation above the threshold is an indication for a non uniformity that requires offset calibration.

It should be noted that the blind decoders of column (j+1) are calibrated for their gain and offset in a same manner as all the others, i×j scenery detectors of the array. More particularly, they are calibrated any time the shutter is closed. It takes of course a full frame period to read all the detectors in column (j+1). As said, at the end of each frame reading, the readouts from all the detectors of column (j+1) are averaged, providing an average value m. Furthermore, the standard deviation of the detectors readouts is calculated. If the standard deviation is found to be above some predefined threshold value, it is concluded that it is necessary to perform a non uniformity correction procedure. Therefore, according to the present invention only when the standard deviation of the readouts from the j+1 column exceeds said predetermined value Q, a calibration which involves the closure of a shutter (or the providing of a homogeneous image) is performed.

More particularly, every frame the following expression is checked:

$$\sqrt{(d_1^2+d_2^2+d_3^2+\ldots d_i^2)} \geq Q \qquad (1)$$

wherein:

$d_i$—indicates the deviation of a specific readout from detector i (in column j +1) from the mean m of the readouts of all the detectors in column (j+1);

Q—indicates a predefined threshold value;

When the condition of expression (1) is satisfied, a calibration procedure takes place.

It should be noted that according to the present invention the reference surface preferably extends from the case and it shields all the resistors $R_{p(j+1)}$. It should also be noted that more than one reference surface may be used, as long as the temperature and emissivity over said surfaces is homogeneous.

FIG. 3 illustrates the general mechanical structure of a bolometer-type FPA and its case, according to an embodiment of the present invention, in which the reference surface is a baffle 14 which extends from the case. The outer walls 12 of the case are made from a thermally conducting material and serve as a heat sink for the substrate and for the thermally shorted resistors $R_m$ and $R_c$ (not shown in FIG. 3). The FPA substrate is indicated as numeral 13, and it comprises at least the plurality (i×j) of the active pixel resistors $R_p$, and the plurality of "blind" resistors $R_r$. A transparent window 15 is provided above the FPA for allowing the radiation from the scenery to impinge on the active resistors $R_p$. The i blind resistors $R_r$ are spread adjacent the active resistors $R_p$ and are shielded from the scenery by means of baffles 14, that are thermally connected to the case walls 12. As shown, the resistors $R_p(j+1)$ are also shielded by the same baffle 14.

As has been shown, the present invention provides an indication as to when an offset calibration (which involves the closure of a shutter) is required. Therefore, while in the prior art the calibration was made arbitrarily every predetermined period of time, according to the present invention the calibration, having the indication for non-uniformity, is made only when it is indeed required. Therefore, the present invention can eliminate the performance of unnecessary calibrations, and can obviously extend the periods between calibrations.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A focal plan array system of the bolometer type having means for determining the rate of non uniformity which comprises:
  a) an array of i×j pixel detectors of the bolometer type for sensing scenery radiation;
  b) a case which accommodates said array of detectors, said case having a front window that provides exposure to the sensing element of all the i×j pixel detectors to radiation coming from the scenery;
  c) at least a portion of column j+1 of blind detectors that are shielded from the scenery by a homogeneous reference surface;
  d) reading circuitry for reading indication for the scenery radiation as sensed by each of the i×j detectors of the array, and for reading indication for the non uniformity as sensed by said detectors in column (j+1);
  e) a register for recording the radiation values as read from all the detectors within column (j+1); and
  f) a processing unit for finding the standard deviation σ of all the values in said register, and for comparing the same to a predetermined threshold Q, wherein a standard deviation above Q being an indication for a non uniformity above the allowed level.

2. A focal plane array system according to claim 1, further comprising mechanism for providing a homogeneous image to all the FPA detectors, and a calibrating circuitry for offset calibrating all the detectors of the FPA, said mechanism and circuitry are activated when said indication for non-uniformity is observed to be above said predetermined threshold Q.

3. A focal plan array system according to claim 1 wherein said homogeneous reference surface is baffle extending from the case.

4. A focal plan array system according to claim 1, wherein all the focal plan array detectors, including those within column (j+1) perform differential measurement of radiation.

5. A focal plan array system according to claim 4, wherein each of the detectors has a structure of a Wheatstone bridge type.

6. A focal plan array system according to claim 5, wherein each of the i×j Wheatstone bridge type detectors, and each of the detectors within column (j+1) has two branches, as follows:
  a) a first branch comprising a first resistor $R_m$ which is thermally shorted to a substrate which supports the array and is common to all the decoders of the array and a second resistor $R_r$ common to each of the decoders within one of the rows i and which is shielded by said at least one homogeneous reference surface; and
  b) a second branch comprising a third resistor $R_c$ which is thermally shorted to the said supporting substrate and which is common to all of the decoders within each of the columns j and a fourth resistor $R_p$ which is unique for each decoder and which is exposed to the scenery.

7. A focal plan array system according to claim 1, wherein the reading circuitry comprises a row selector for selecting at each time a row of the array, and j+1 column amplifiers for correspondingly receiving and amplifying the sensed radiation by each of the decoders within the selected row.

8. A method for determining the rate of the non uniformity in a focal plane array of the bolometer type, comprising the steps of
  a) providing a focal plane array of i×j bolometer type detectors, all being exposed to the scenery;
  b) providing at least a portion of an additional column (j+1) of bolometer type detectors, all said detectors in column (j+1) being masked from the scenery by means of a homogeneous surface;
  c) predefining a non uniformity threshold Q, relating to the non uniformity of behavior of the decoders;
  d) sequentially reading in a row by row manner the values as sensed by the i×j detectors of the FPA and as sensed by the detectors in the (j+1) column;
  e) recording at a column register the readings that are sensed by the decoder of column j+1;
  f) calculating the standard deviation of all the values in said column register and comparing the standard deviation with the threshold Q;
  g) if said standard deviation is found to be below Q, continuing to normally operate the FPA; and
  h) if, however, the standard deviation is found to be above Q, stopping the operation of the FPA, and performing a non uniformity calibration of the FPA decoders.

* * * * *